United States Patent [19]
Barker et al.

[11] Patent Number: 4,566,477
[45] Date of Patent: Jan. 28, 1986

[54] FLUID FLOW CONTROL APPARATUS

[75] Inventors: Charles A. Barker, Indianapolis; Jim L. Rau, Lafayette, both of Ind.

[73] Assignee: TRW Inc., Cleveland, Ohio

[21] Appl. No.: 659,026

[22] Filed: Oct. 9, 1984

Related U.S. Application Data

[63] Continuation of Ser. No. 361,851, Mar. 25, 1982, abandoned.

[51] Int. Cl.$^4$ ............................................. F15B 13/06
[52] U.S. Cl. ........................................ 137/101; 91/29; 91/31; 91/516
[58] Field of Search ............... 91/516, 29, 31, 514, 91/532, 28; 60/422; 137/101, 118

[56] References Cited

U.S. PATENT DOCUMENTS

| | | | |
|---|---|---|---|
| 3,279,558 | 10/1966 | Allen et al. | 60/422 |
| 3,916,932 | 11/1975 | Thorson | 60/422 |
| 4,043,419 | 8/1977 | Larson et al. | 60/420 |
| 4,253,382 | 3/1981 | Yip. | |
| 4,254,687 | 3/1981 | Alexander | 91/29 |
| 4,385,674 | 5/1983 | Presley | 60/422 |
| 4,488,569 | 12/1984 | Rau | 91/516 |

FOREIGN PATENT DOCUMENTS

| | | |
|---|---|---|
| 0061005 | 9/1982 | European Pat. Off. . |
| 2728118 | 1/1978 | Fed. Rep. of Germany . |
| 2716868 | 10/1978 | Fed. Rep. of Germany . |
| 2738483 | 3/1979 | Fed. Rep. of Germany . |
| 2937153 | 4/1980 | Fed. Rep. of Germany . |

OTHER PUBLICATIONS

Drawings from U.S. Patent Application Ser. No. 243,497, filed Mar. 13, 1981, by Jim L. Rau and Ronald L. LaHue, entitled "Hydrostatic Load-Sense System".

*Primary Examiner*—Robert E. Garrett
*Assistant Examiner*—Richard S. Meyer
*Attorney, Agent, or Firm*—Yount & Tarolli

[57] ABSTRACT

An apparatus for controlling fluid flow to a steering motor and an auxiliary apparatus is capable of smoothly changing between conditions in which it directs relatively small and relatively large flows of fluid to the auxiliary apparatus. The apparatus includes a priority valve assembly having a valve member positioned in accordance with variations in the demand for steering fluid. A land on the valve member cooperates with a fixed valve surface to form a variable size orifice through which fluid flows to a steering controller. A second land on the valve member cooperates with a fixed valve surface to form a variable size main auxiliary flow control orifice through which all of the fluid flow to the auxiliary apparatus is directed during relatively low fluid flow rates to the auxiliary apparatus. A third land on the valve member cooperates with a fixed valve surface to form a second variable size flow control orifice through which additional fluid flow is directed to the auxiliary apparatus during relatively high fluid flow rates to the auxiliary apparatus.

6 Claims, 6 Drawing Figures

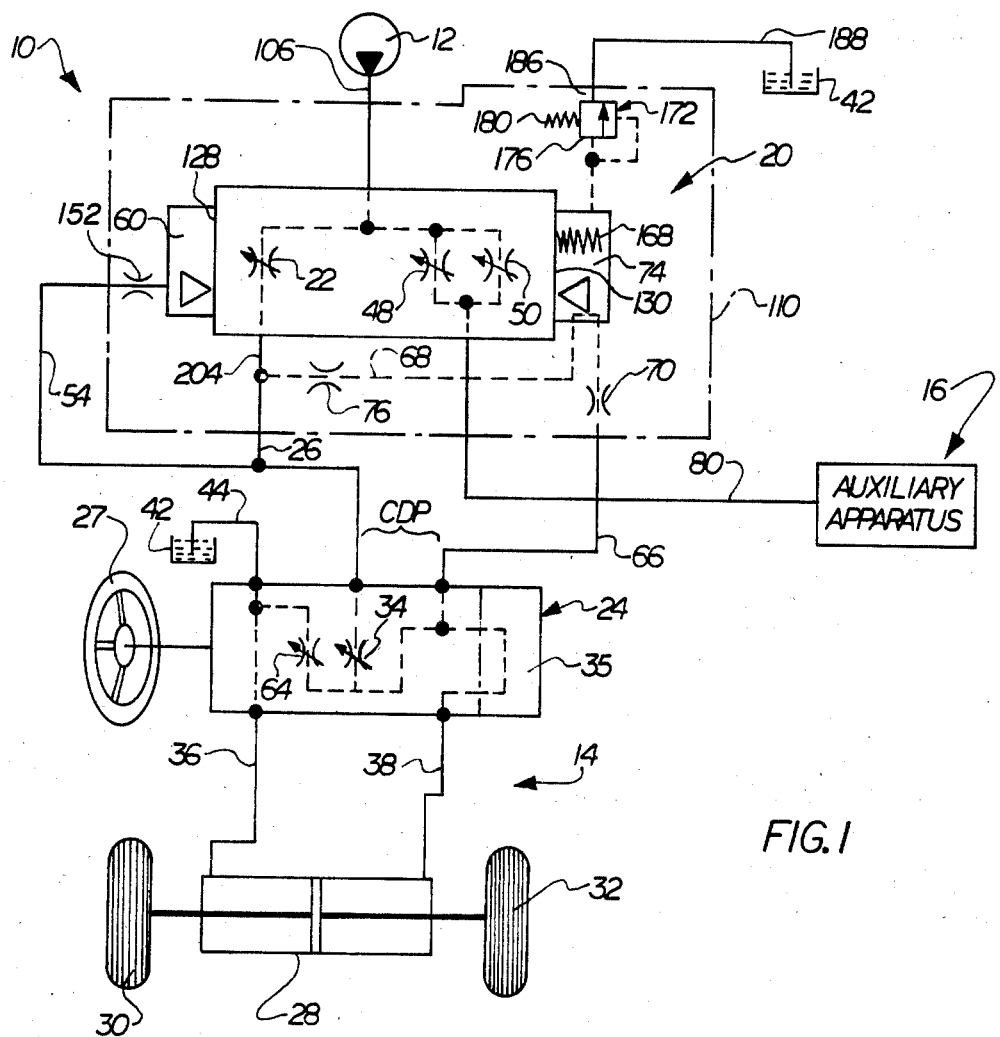
FIG.1
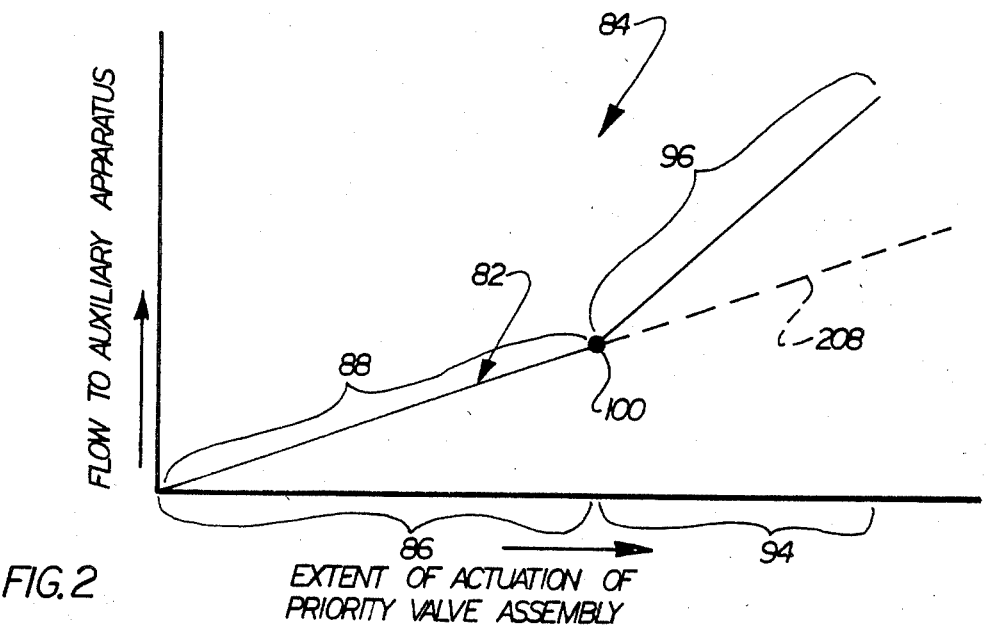
FIG.2 EXTENT OF ACTUATION OF PRIORITY VALVE ASSEMBLY

FLUID FLOW CONTROL APPARATUS

This application is a continuation of application Ser. No. 361,851, filed Mar. 25, 1982, now abandoned.

BACKGROUND OF THE INVENTION

The present invention relates to a new and improved priority valve for controlling fluid flow from a pump to an auxiliary apparatus and a hydrostatic steering controller.

A known priority valve for controlling the flow of fluid to a hydrostatic steering controller and to an auxiliary apparatus is disclosed in U.S. patent application Ser. No. 243,497, filed Mar. 13, 1981 by Jim L. Rau and Ronald L. LaHue and entitled "Hydrostatic Load-Sense Steering System". This application discloses a priority valve which responds to changes in the demand for fluid by the steering controller and to changes in the steering load. The priority valve disclosed in the aforementioned application includes a priority flow control orifice through which fluid flow to a hydrostatic steering controller is varied as a function of variations in the demand for fluid flow and as a function of variations in the steering load. The priority valve also has a single variable size orifice through which fluid which is not required for steering purposes is directed to an auxiliary apparatus. To meet the demand for fluid flow, the priority valve seeks to achieve a steady state condition in which a constant pressure differential is maintained across a variable orifice located in the steering controller.

The priority valve disclosed in U.S. application Ser. No. 243,497 includes a valve spool which is biased by the pressure derived from a pilot flow of fluid into a position in which the main flow of hydraulic fluid is directed to a steering controller. Specifically, a pilot flow of fluid is established through the hydrostatic steering controller. The pilot flow is restricted when a steering operation is initiated. The flow restriction causes a back pressure to develop in the pilot line which acts on a priority valve spool to move the spool into a position to direct fluid flow to the steering controller. This priority valve is satisfactory in its mode of operation and is effective to respond quickly to changes in the demand for fluid by the power steering system. Nonetheless, it would be desirable to improve the valve so that it could supply demands for steering fluid more smoothly and accurately despite a wide range of fluid flows to the valve from a pump or other source of fluid. Such an improved valve would have to provide a consistent steady state pressure differential across the variable orifice in the steering controller and rapidly regain the pressure differential after responding to rapid variations in steering and auxiliary flow requirements and the flow and pressure from the pump. An improved valve would also have to hold to a minimum the pressure drop across the valve, from its inlet to its auxiliary port.

There are two well recognized ways of enabling a priority valve to satisfy widely varying demands for steering fluid and maintain a minimum bypass pressure drop across the valve. One way is to provide the valve spool with a relatively large diameter land. A relatively small axial movement of the land relative to a fixed valve surface will thus open an annular orifice between the land and the valve surface which has a relatively large maximum cross sectional area. Unfortunately, when the spool must control relatively small fluid flows, difficulty is encountered in accurately moving the valve spool through the small distances required to meter the flow and maintain the desired pressure differential across the variable orifice in the steering controller. Further, a valve spool with a large diameter land is heavy and has a high inertia. The biasing spring that acts on the spool must exert a higher preload, which may require a higher spring rate. A higher spring rate will make it more difficult to maintain the desired pressure differential. A large priority valve also requires a relatively large pilot flow of fluid when the valve is used in a system such as shown in the aforementioned U.S. patent application Ser. No. 243,497. Thus, providing a valve spool with a large diameter land may be ineffective to maintain a desired pressure differential, although flow could be bypassed to auxiliary at an appropriate rated pressure drop.

The other well known way of increasing the flow capacity of a priority valve is to move the valve spool axially through a larger distance. Moving a valve spool through a larger axial distance rather than increasing the diameter of its lands, will permit the valve to control accurately relatively small fluid flows. At the same time, however, the increased axial spool movement will make the valve under-responsive at high fluid flows. Moreover, when the valve spool is moved through relatively large distances, the variations in spring rate caused by compression and extension of the spool's biasing spring will be increased. Changes in the spring rate will tend to cause wider variations in the desired pressure differential. Thus, moving a valve spool through a longer axial distance may also be ineffective to maintain a desired pressure differential.

With the known ways of permitting a valve to handle large and small fluid flows, the response of the valve to changing operating conditions is sluggish or under-responsive. The valve cannot quickly or smoothly respond to rapid increases or decreases in the quantity of fluid required by the hydraulic circuits to which the valve is controlling flow. The ability of the valve to control its desired constant pressure differential is diminished in order to obtain a low pressure drop across the valve to the auxiliary port.

BRIEF SUMMARY OF THE INVENTION

The present invention provides a new and improved apparatus for controlling a flow of fluid to a steering controller and to an auxiliary apparatus as a function of variations in the demand for fluid by the steering controller. The apparatus includes a priority valve having a pair of variable size orifices for controlling the flow of fluid to the auxiliary apparatus and an orifice for controlling the flow of fluid to the steering controller. Depending upon the demand for fluid by the steering controller, both of the orifices that control flow to the auxiliary apparatus may be open. If more fluid is required by the steering controller, one of the orifices is closed and the other orifice controls the flow of fluid to the auxiliary apparatus.

The orifices in the priority valve are formed by cooperation between lands on a valve member and surfaces on a valve housing. One end of the valve member is exposed to a fluid pressure which is taken from the upstream side of a variable size load sense orifice in the steering controller. The other end of the valve member is exposed to a fluid pressure which is taken from downstream of the controller's load sense orifice. Thus, the valve can efficiently handle a relatively large range of fluid to the auxiliary apparatus, while permitting a relatively constant load sense control differential pressure to be maintained.

Accordingly, it is an object of this invention to provide a new and improved apparatus which varies the rate of flow of fluid to a steering controller and to an auxiliary apparatus as a function of variations in the demand for fluid by the steering controller and in which relatively small flows of fluid to the auxiliary apparatus are directed through only a first auxiliary flow control orifice and relatively large flows of fluid to the auxiliary apparatus are directed through both a first auxiliary flow control orifice and a secondary flow control orifice, the total cross sectional area of the first and secondary auxiliary flow control orifices being varied as a function of variations in the demand for power steering fluid and variations in a pilot fluid pressure.

BRIEF DESCRIPTION OF THE DRAWINGS

The foregoing and other objects and features of the present invention will become more apparent upon a consideration of the following description taken in connection with the accompanying drawings wherein:

FIG. 1 is a schematic illustration of a system for directing a flow of fluid from a single pump through an improved priority valve assembly to a steering controller and to an auxiliary apparatus;

FIG. 2 is a graph illustrating the relationship between the flow of fluid to the auxiliary apparatus and the extent of actuation of the priority valve assembly;

DESCRIPTION OF SPECIFIC PREFERRED EMBODIMENTS OF THE INVENTION

General Description

Figure 3:
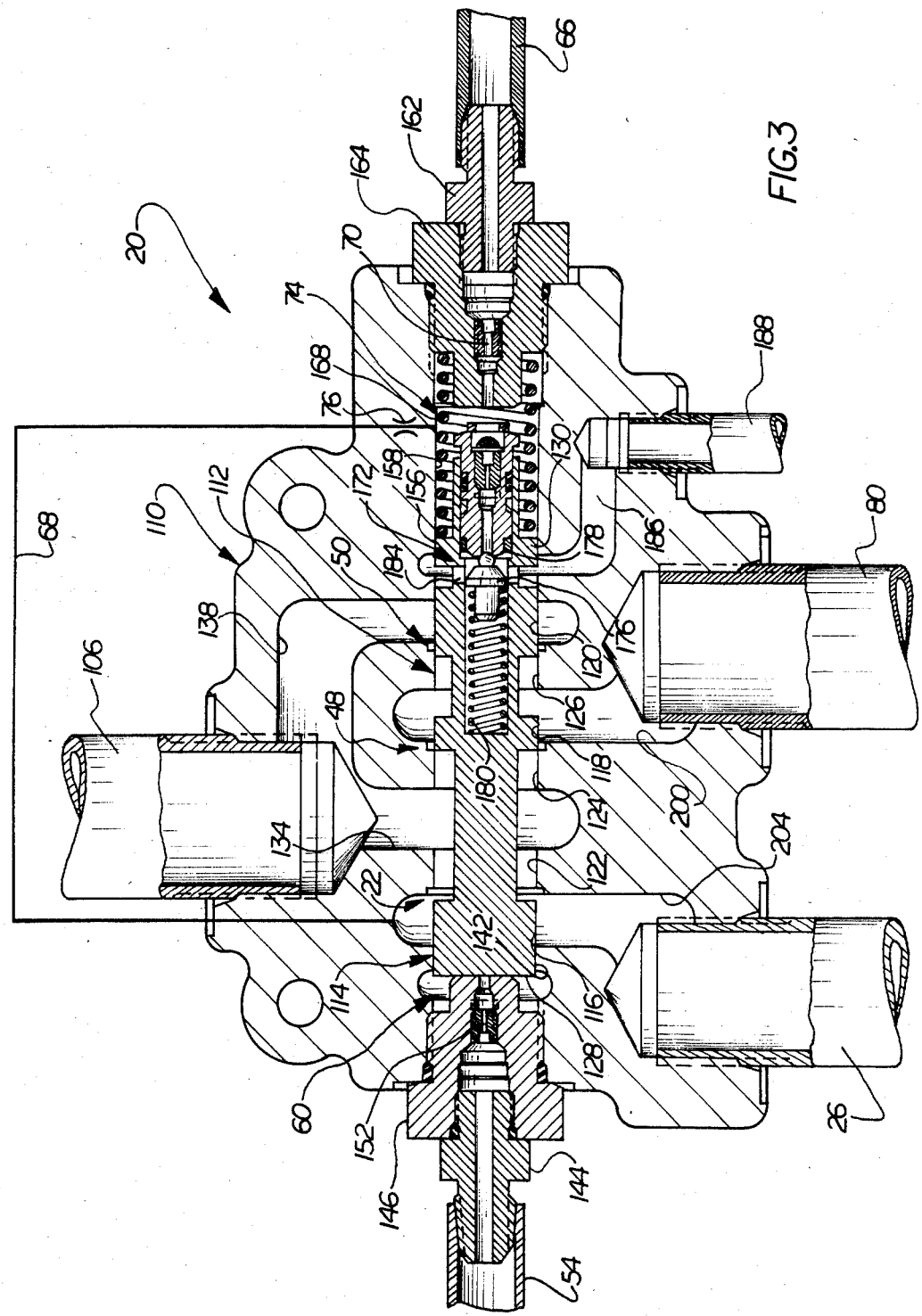
FIG. 3 is a sectional view of the priority valve assembly, the priority valve assembly being illustrated in an initial or priority condition blocking fluid flow to the auxiliary apparatus and directing fluid flow the steering controller.

An apparatus 10 for directing fluid flow from a single engine driven pump 12 to a power steering apparatus 14 and an auxiliary apparatus 16 is illustrated schematically in FIG. 1. The apparatus 10 includes an improved priority valve assembly 20 containing a variable size (i.e., flow area) priority flow control orifice 22 which is connected in fluid communication with a hydrostatic steering controller 24 by a conduit 26. The steering controller 24 is actuated by rotation of a steering wheel 27 to direct fluid to a power steering motor 28 connected with steerable vehicle wheels 30 and 32.

When the steering apparatus 14 is in the inactive condition illustrated schematically in FIG. 1, a variable size (i.e., area) load sense or main flow control orifice 34 in the controller 24 is closed, and fluid flow through the controller 24 is blocked. Upon rotation of the steering wheel 27 to initiate a steering operation, the load sense orifice 34 is opened and high pressure fluid is directed to a metering unit 35. A flow of fluid is directed from the metering unit 35 to either a conduit 36 or a conduit 38 to the motor 28. The other one of the two conduits 36 and 38 is connected to fluid reservoir 42 through the controller 24 and a conduit 44. Operation of the motor 28 effects turning movement of the steerable vehicle wheels 30 and 32 in a known manner.

In accordance with a feature of the present invention, fluid which is not required for actuation of the power steering apparatus 14 is directed to the auxiliary apparatus 16 through either a variable size (i.e., cross sectional area) main auxiliary flow control orifice 48 (FIG. 1) or both the main auxiliary flow control orifice and a variable size secondary auxiliary flow control orifice 50. When fluid is to be supplied to the auxiliary apparatus 16 at a relatively small flow rate, the main auxiliary flow control orifice 48 is opened and the secondary auxiliary flow control orifice 50 is closed. When fluid is to be supplied to the auxiliary apparatus 16 at a relatively large flow rate, both the main auxiliary flow control orifice 48 and the secondary auxiliary flow control orifice 50 are opened.

The sizes of the orifices 22, 48 and 50 are varied as a function of variations in the demand for fluid as indicated by the extent to which of the load sense orifice 34 opens to meet the flow requirements of the power steering apparatus 14 during turning of the steerable vehicle wheels 30 and 32. To provide a priority valve control signal which varies as a function of variations in the demand for fluid by the steering controller 24, a conduit 54 transmits fluid pressure from the upstream side of the load sense orifice 34 to a variable volume chamber 60 at one end of the priority valve assembly 20. A conduit 66 transmits fluid pressure from the downstream side of the load sense orifice 34 through a fixed orifice 70 to a variable volume chamber 74 at the end of the priority valve assembly 20 opposite from the variable volume chamber 60. The priority valve assembly 20 is thus exposed to a pressure differential which varies as a function of variations in the pressure differential across the load sense orifice 34.

When there is a relatively large demand for fluid by the steering controller 24, as during rapid turning of the vehicle wheels 30 and 32, the load sense orifice 34 is fully opened. Increasing the flow area of the orifice 34 decreases the pressure differential across the orifice. The change in the pressure differential is transmitted to the variable volume chambers 60 and 74 and causes the valve 20 to restrict flow to the auxiliary apparatus and increase flow to the steering controller 24. The increased flow to the controller will tend to satisfy the demand for fluid and to increase the pressure differential across the load sense orifice 34. When a steady state is achieved and the demand for fluid flow is being satisfied, the pressure differential across the load sense orifice will be constant and the priority valve assembly 20 will maintain a constant division of flow between the steering controller 24 and the auxiliary apparatus 16. Similarly, movements of the steering wheel 27 which decrease the flow area of the load sense orifice 34 will increase the pressure differential across the orifice. The change in the pressure differential will be transmitted to the priority valve assembly 20 and cause the assembly to restrict flow to the steering controller 24 and increase flow to the auxiliary apparatus. The decrease in flow to the controller 24 will tend to decrease the pressure differential across the flow control orifice 34, and cause a steady state to be achieved in which demand for fluid flow is just being satisfied. In the steady state, the pressure differential across the orifice 34 will be constant, as will the division of flow between the controller 24 and the auxiliary apparatus 16.

In addition to being reponsive to current demands for fluid by the steering apparatus 14, the priority valve assembly 20 is responsive to impending demands for fluid. To enable the priority valve assembly 20 to anticipate demands for steering fluid, a variable size orifice 64 is provided in the steering controller 24. When the power steering apparatus 14 is inactive, the orifice 64 is open, and there is a pilot flow of fluid through the orifice. The conduit 66 connects the orifice 64 with the a variable volume chamber 74 at one end of the priority valve assembly 20 through a fixed size orifice 70. The chamber 74 is supplied with fluid from conduit 26 by way of a pilot orifice 76 and a conduit 68.

When the steering apparatus 14 is inactive, the size of the orifice 64 is relatively large and the pilot flow pressure is relatively low. Upon initiation of a steering operation, the orifice 64 is reduced in size. The reduction in size of orifice 64 causes a rapid increase in pressure in conduit 66 and chamber 74. The pressure increase in the chamber 74 effectively decreases the pressure differential to which the priority valve assembly 20 is exposed. The change in the pressure differential causes the valve assembly 20 to increase the fluid flow to the load sense orifice 34 in the steering controller 24 by increasing the size of the orifice 22. As the load sense orifice 34 opens, the flow to the controller is already increasing to meet the anticipted steering demand. During the subsequent steering operation, the pilot flow of fluid is combined with the flow from the conduit 26 downstream of the load sense orifice 34 and is directed to the motor 28 through the metering unit 35 of the hydrostatic steering controller 24. The manner in which the size of the orifice 64 is reduced to signal the beginning of a steering operation is the same as is described in U.S. patent application Ser. No. 243,497 filed Mar. 13, 1981 by Rau and LaHue. The disclosure in the aforementioned U.S. patent application Ser. No. 243,497 filed Mar. 13, 1981 by Rau and LaHue is hereby incorporated herein by this reference thereto.

The manner in which fluid flow to the auxiliary apparatus 16 varies as a function of the extent of actuation of the priority valve assembly 20 is illustrated by curve 82 of a graph 84 (FIG. 2). For purposes of illustration, the pressure differential across the load sense orifice 34 is considered as being constant. While the priority valve assembly 20 is being actuated to a relatively small extent, indicated by the bracket 86 in FIG. 2, the flow of fluid to the auxiliary apparatus increases at a relatively low and constant rate with increased actuation of the priority valve assembly 20. The rate at which the flow to the auxiliary apparatus 16 increases with valve actuation at low flows is indicated by the portion 88 of the curve 82. At low flows, actuation of the priority valve assembly 20 through a small increment effects a relatively small change in the volume of flow of fluid to the auxiliary apparatus 16.

When the priority valve assembly 20 has been actuated to a relatively large extent, that is, in the range indicated by the bracket 94 in FIG. 2, the rate of flow of fluid to the auxiliary apparatus 16 varies in the manner indicated by the portion 96 of the curve 82. The slope of the portion 96 of the curve 82 is greater than the slope of the portion 88 of the curve. Therefore, when the priority valve assembly 20 has been actuated to a substantial extent, a small change in the extent of actuation of the priority valve assembly results in a relatively large change in the volume of flow of fluid to the auxiliary apparatus 16.

The different slopes of the portions 88 and 96 of the curve 82 are due to opening of the secondary auxiliary flow control orifice 50 at the point indicated at 100 in FIG. 2. Thus, before the point indicated at 100 in FIG. 2, the auxiliary flow control orifice 50 is closed, and the volume of fluid flow to the auxiliary apparatus 16 is varied by changing the size of just the main auxiliary flow control orifice 48. After both of the orifices 48 and 50 have been opened, variations in the extent of actuation of the priority valve assembly 20 varies the size of both of the orifices 48 and 50. This results in a relatively large change in the area through which fluid can flow to the auxiliary apparatus 16 with each incremental change in the extent of actuation of the priority valve assembly 20. Hence the open flow area of the orifices 48 and 50 is proportional to the level of fluid flow to the auxiliary apparatus for each portion of the curve 82.

Priority Valve—Construction

The priority valve assembly 20 is an apparatus which directs fluid from the pump 12 to the steering controller 24 and to the auxiliary apparatus 16. The priority valve assembly 20 divides fluid flow received from the pump 12 through a conduit 106 (see FIG. 1) between the conduits 26 and 80 connected with the steering controller 24 and auxiliary apparatus 16, respectively. The priority valve assembly 20 responds quickly to changes in the demand for fluid by the steering controller 24. In addition, the priority valve assembly 20 is effective to direct a relatively large range of flows of fluid to the auxiliary apparatus 16 through the conduit 80. This enables the apparatus 10 to function smoothly even though the output from the pump 12 varies over a relatively large operating range according to variations in the speed at which the pump is driven.

The priority control valve assembly 20 includes a housing 110 (see FIG. 3) having a bore 112 in which an axially movable valve member 114 is disposed. The valve member 114 has cylindrical lands 116, 118 and 120 which cooperate with cylindrical lands 122, 124 and 126 on the housing 110 to define the variable size orifices 22, 48 and 50. Opposite axial end portions 128 and 130 of the valve member 114 cooperate with the housing 110 to define the variable volume control chambers 60 and 74 at the ends of the valve member.

Fluid supplied by the pump 12 (FIG. 1) enters the housing 110 through the conduit 106. The fluid flow from the conduit 106 enters a main housing passage 134 (FIG. 3), which intersects the bore 112 between the cylindrical housing lands 122 and 124. Fluid flow through the main passage 134 is thus directed to the orifice 22 and the orifice 48. When the valve member 114 is in the initial or priority condition shown in FIG. 3, all of the fluid which enters the housing 110 from the conduit 106 flows through the priority flow control orifice 22 to the pilot flow conduit 68 and to a passage 204 and the conduit 26 leading to the steering control valve assembly 24. The land 118 on the valve member 114 engages the housing land 124 to block fluid flow through the main auxiliary flow control orifice 48.

In addition to being conducted from the conduit 106 to the priority flow control orifice 22 and the main auxiliary flow control orifice 48, fluid is directed through a housing passage 138 to the secondary auxiliary flow control orifice 50. When the valve member 114 is in the initial or priority condition illustrated in FIG. 3, the secondary auxiliary flow control orifice 50 is closed. Thus, the cylindrical valve land 120 is disposed in sealing engagement with the cylindrical housing land 126 to block fluid flow through the variable size orifice 50.

The left (as viewed in FIG. 3) end portion 128 of the valve member 114 cooperates with a cylindrical housing land 142 to form one end of the variable volume chamber 60. The rest of the variable volume chamber 60 is formed by the housing 110 and a fitting 146. The variable volume chamber 60 is supplied with fluid through conduit 54 which is connected to the housing 110 by fittings 144 and 146. The conduit 54 is also connected with the power steering fluid supply conduit 26 (see FIG. 1). A fixed area orifice 152 is provided between the conduit 54 and the variable volume chamber 60 to regulate the rate at which fluid flows to and from the variable volume chamber 60. It should be understood that the conduit 54 and orifice 152 could be placed in the priority valve assembly 20 without outside connections.

The right (as viewed in FIG. 3) end portion 130 of the valve 114 has a cylindrical land 156 which engages a cylindrical wall 158 of the housing 110 to define one end of the variable volume chamber 74. The rest of the chamber 74 is formed by the housing 110 and a fitting 164.

The variable volume chamber 74 is connected with the conduit 66 through a pair of fittings 162 and 164. The variable volume chamber 74 is connected with the downstream side of the priority flow control orifice 22 through the passage 68, which is drilled in the housing 110, and the pilot orifice 76, which is also located in the housing. The fixed area orifice 70 is provided in the fitting 164 to control the rate at which fluid flows into in the variable volume chamber 74. A spring 168 is disposed between the fitting 164 and the end portion 130 of the valve member 114 in a coaxial relationship with the valve member. The spring 168 urges the valve member to an initial or priority condition shown in FIG. 3.

In addition to being urged to the initial or priority condition shown in FIG. 3 by the spring 168, the valve member 114 is urged to the initial condition by the pressure of fluid in the variable volume chamber 74. The variable volume chamber 74 is supplied with fluid pressure through the conduit 68 which is connected with the variable size orifice 64 in the steering controller 24 (see FIG. 1). Therefore the fluid pressure in the chamber 74 to which the end portion 130 of the valve member 114 is exposed varies as a function of variations in the load applied to the steerable vehicle wheels 30 and 32.

A bypass valve assembly 172 is provided in the valve member 114 in a coaxial relationship with the valve spring 168. The bypass valve assembly 172 includes a valve member 176 which is biased to a closed position engaging a valve seat 178 by a biasing spring 180. If the fluid pressure in the chamber 74 should become excessive, the valve member 176 is moved axially toward the left (as viewed in FIG. 3) against the influence of biasing spring 180 to port fluid to radially extending passages 184 formed in the valve member 114 and connected in fluid communication with a valve housing passage 186. The valve housing passage 186 is connected with a conduit 188 leading to the reservoir 44.

Priority Valve—Operation

Prior to starting of the engine which drives the pump 12 (FIG. 1), the priority valve assembly 20 is in the initial or priority condition shown in FIG. 3. There is little or no fluid pressure in the two variable volume chambers 60 and 74. Therefore, the valve member 114 is urged to the initial condition shown in FIG. 3 by the valve spring 168.

Upon starting of the engine and operation of the pump 12, fluid is conducted from the pump through the conduit 106 to the fully opened priority flow control orifice 22. The fluid flows through the open orifice 22 to the conduit 26 which is connected to the steering control valve assembly in the controller 24. The controller 24 is in its neutral or unactuated condition shown in FIG. 1 and the load sense orifice 34 (FIG. 1) is closed. Therefore, fluid flow from the conduit 26 to the power steering motor 28 is blocked. This results in a fluid pressure differential between the conduit 26 and the conduit 66 being equal to a predetermined control differential pressure.

The fluid pressure in the conduit 26 is transmitted through the conduit 54 to the variable volume chamber 60 at the left end (as viewed in FIG. 3) of the valve member 114. Similarly, fluid pressure is transmitted from the conduit 26 through the conduit 68 to the fixed orifice 76 (FIG. 1) and the variable volume chamber 74 at the right end (as viewed in FIG. 3) of the valve member 114. Due to a pressure drop caused by the small pilot flow of fluid through the orifice 76, the fluid pressure transmitted to the variable volume chamber 74 is less than the fluid pressure transmitted to the variable volume chamber 60. From the chamber 74, the pilot flow of fluid is directed through the relief orifice 70, conduit 66, the variable orifice 64, and conduit 44 to the reservoir 42.

Assuming that the engine driven pump 12 has an output for an engine idle condition which exceeds pilot flow requirements, the fluid pressure in the variable volume chamber 60 will increase and substantially exceed the fluid pressure transmitted through the fixed orifice 76 to the variable volume chamber 74. The fluid pressure in the variable volume chamber 60 will urge the valve member 114 toward the right (as viewed in FIG. 3) against the influence of the biasing spring 168 and the fluid pressure in the variable volume chamber 74. This causes the valve member 114 to shift toward the right from the initial or priority condition shown in FIG. 3 to the intermediate condition shown in FIG. 4.

Figure 4:
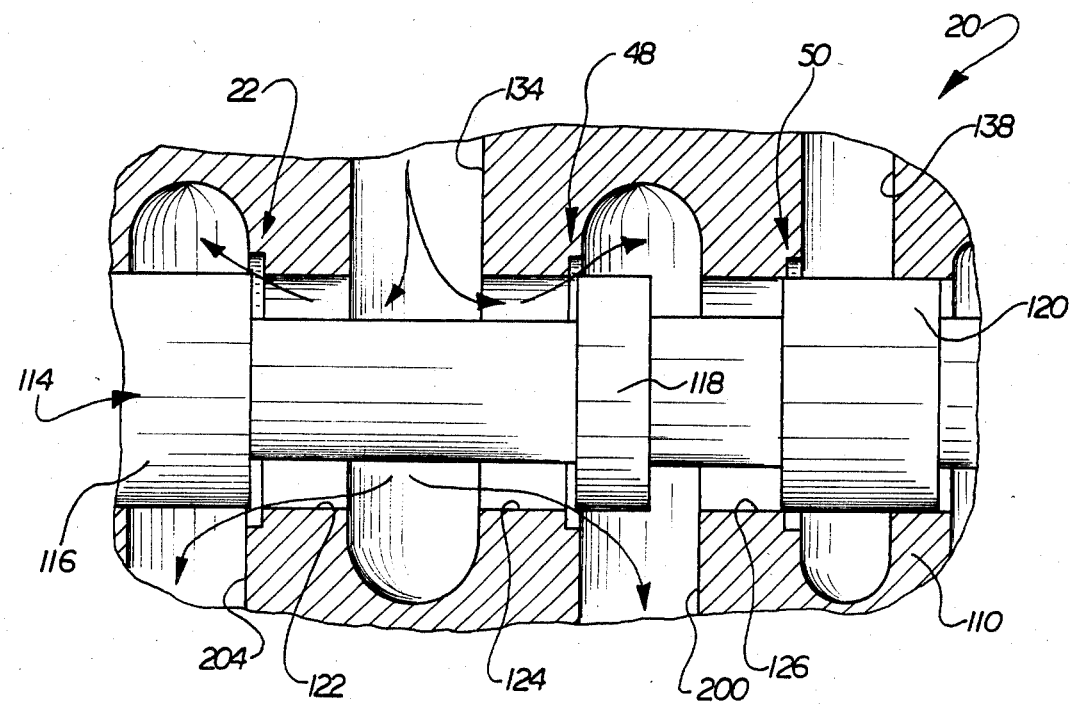
FIG. 4 is an enlarged fragmentary view of a portion of the priority valve assembly of FIG. 3 and illustrating the valve assembly in an intermediate condition directing fluid flow to the steering controller and directing a relatively small flow of fluid to the auxiliary apparatus.

When the valve member 114 is in the intermediate condition shown in FIG. 4, the fluid flow from the pump 12 is divided between the auxiliary apparatus 16 and the steering controller 24 by the priority valve assembly 20. The flow area of the orifice 22 is reduced from the fully open area shown in FIG. 3 so as to restrict fluid flow to the power steering apparatus 14. In addition, the orifice 48 is opened to enable fluid to flow through the orifice 48 to a housing passage 200 which connects with the conduit 80 (see FIG. 3). The inlet fluid flow received in the valve passage 134 is thus split between the valve passage 200 leading to the auxiliary apparatus supply conduit 80 and the valve passage 204 leading to the power steering system supply conduit 26.

When the priority valve assembly 20 is in the intermediate condition shown in FIG. 4, the flow of fluid to the auxiliary apparatus varies with movement of the valve member 114 in the manner shown by the portion 88 of the curve 82 (FIG. 2). Therefore, movement of the valve member 114 through a small distance toward either the left or the right (as viewed in FIG. 4) effects relatively small changes in the fluid flow to the auxiliary apparatus 16 and the power steering apparatus 14.

If the power steering apparatus 14 is actuated at this time to slowly turn the vehicle wheels 30 and 32, the valve member 114 will shift through a small distance toward the left from the position shown in FIG. 4 to increase the size of the orifice 22 and reduce the size of the orifice 48. This results in a small increase in the flow of fluid directed to the power steering system 14 and a corresponding reduction in the amount of fluid ported to the auxiliary apparatus 16. Upon termination of the relatively slow turning movement of the steerable vehicle wheels 30 and 32, the valve member 114 will shift through a small distance toward the right to slightly reduce the size of the primary flow control orifice 22 and increase the size of the main auxiliary flow control orifice 48. This results in a small increase in the amount of fluid which is available for the auxiliary apparatus 16.

It should be noted that there is a continuous pilot flow of fluid through the two fixed orifices 76 and 70 and the variable orifice 64 in the steering controller 24 when the steering controller is in the neutral or unactuated condition shown schematically in FIG. 1. The continuous pilot flow of fluid enables the fluid pressure in the variable volume chamber 74 to be quickly varied in response to actuation of the power steering apparatus 14 or to changes in the flow from the pump 12.

If the speed at which the pump is driven is increased so that the fluid output from the pump 12 increases substantially and the power steering apparatus 14 remains in the unactuated condition shown in FIG. 1, the fluid pressure in the conduit 26 will increase. The pressure increases despite the continuous pilot flow of fluid through the conduits 68, 66 and 44 to the reservoir 42 because the orifices 76, 70 and 64 restrict the pilot flow. The increased fluid pressure in the conduit 26 is transmitted to the variable volume chamber 60 and effects movement of the valve member rightwardly from the position shown in FIG. 4 toward the one shown in FIG. 5 to open the variable size orifice 50.

Opening the orifice 50 enables the fluid flow to be conducted to the auxiliary apparatus through both of the orifices 48 and 50. Incremental movement of the valve member 114 toward either the left or the right (as viewed in FIG. 5) results in a variation in the sizes of both orifices 48 and 50. Therefore, each increment of movement of the valve member 114 results in a relatively large change in the area which is available for fluid to flow to the auxiliary apparatus 16 through the priority valve assembly 20. The valve member 94 is now in the range of movement indicated by the portion of the graph designated 94 in FIG. 2. The manner in which flow changes with each increment of movement of the valve member is indicated by the portion of the curve 82 designated by the bracket 96 in FIG. 2.

Figure 5:
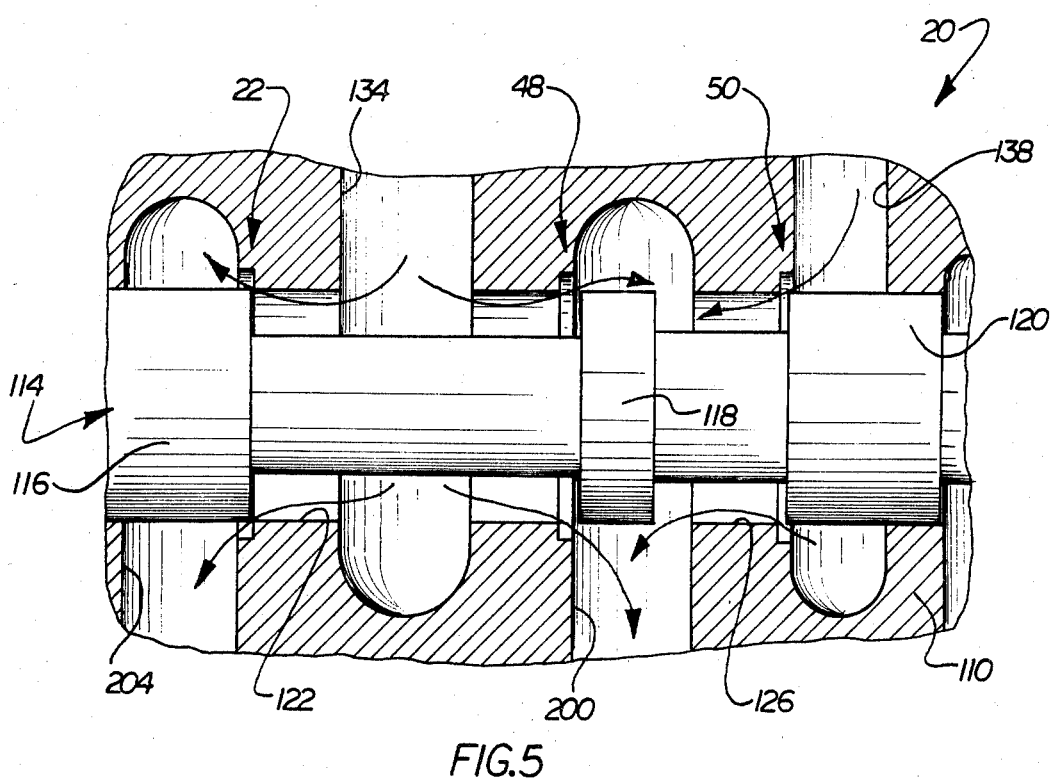
FIG. 5 is an enlarged fragmentary view, generally similar to FIG. 4, illustrating the priority valve assembly in a condition directing a relatively large flow of fluid to the auxiliary apparatus through both the main auxiliary flow control orifice and a secondary auxiliary flow control orifice.

The relatively large change in the volume of flow of fluid to the auxiliary apparatus 16 with each increment of movement of the valve member 114 when the valve member is in the position shown in FIG. 5 results from changes in the size of both of the orifices 48 and 50. Thus the fluid flow through the orifice 48 will vary in the manner shown by the dashed line 208 in FIG. 2. Added to this flow is the fluid which flows through the orifice 50. The combined flow is indicated by the portion 96 of the curve 82.

Since the priority valve assembly 20 uses only the single orifice 48 to direct fluid to the auxiliary apparatus 16 for relatively small flows from the pump 12 and uses both of the orifices 48 and 50 to direct fluid to the auxiliary apparatus for relatively large flows from the pump 12, the priority valve assembly 20 can smoothly and efficiently handle both large and small rates of flow of fluid. If only the orifice 48 was used to handle all of the fluid flow from the pump 12, either the valve member 114 would have to move through a larger distance in order to handle the maximum flow from the pump or the land 118 would have to be substantially larger in diameter in order to provide the orifice with a flow area capable of handling the maximum flow from the pump. By splitting the flow from the pump between the two orifices 48 and 50, the relatively large flow of fluid can be handled effectively.

When the flow from the pump is reduced so that the orifice 50 is closed, all of the fluid conducted to the auxiliary apparatus 16 passes through the orifice 48. Therefore small movements of the valve member 14 effect relatively small changes in the volume of flow of fluid to the auxiliary apparatus 16. Hence effective control is achieved over small auxiliary flows without detrimental effect on the response to the priority valve, the smooth regulation of flow by the valve, or the maintenance of a substantially constant control pressure differential across the load sense orifice 34 in the steering controller 24.

When the valve member 114 is in the fully open condition shown in FIG. 5, the orifice 22 is still open slightly and a small flow of fluid is conducted through the orifice 22. If the valve member 114 should shift to the right through a distance so as to close the orifice 22, the flow of fluid to conduit 26 would be cut off. A loss of flow to conduit 26 will result in a decrease in the fluid pressure in both the variable volume chamber 60 and the variable volume chamber 74. Since both chambers 60 and 74 are continuously connected with the reservoir 42, the fluid in the two chambers would drain out and the pressure would quickly drop. The biasing spring 168 would then be effective to open the orifice 22 slightly to re-establish a flow of fluid to the conduit 26 and the pressure in chambers 60 and 74.

During a steering operation, the fluid pressure in the variable volume chamber 60 varies as a function of the demand for fluid by the power steering system 14. If a steering operation is undertaken with the priority valve member 114 in the position shown in FIG. 5 directing fluid to the auxiliary apparatus through both the orifice 48 and the orifice 50, the fluid pressure in the chamber 60 (FIG. 3) is reduced, as is the pressure differential to which the valve member 114 is exposed. The biasing spring 168 and the fluid pressure in the variable volume chamber 74 will then move the valve member 114 toward the left (as viewed in FIG. 5) to reduce the fluid flow through the open orifices 48 and 50. Depending upon the demand for fluid by the power steering system 14, the valve 114 might move back to the position shown in FIG. 4 in which the orifice 50 is closed and substantial volume of fluid is directed through the priority flow control orifice 22 to the power steering system 14. Reducing the flow through the orifices 48 and 50 increases the flow through the orifice 22 and thus the flow through the load sense orifice 34. As the increased flow meets the demand for fluid by the steering apparatus 14, the pressure in conduits 26 and 54 will increase. The pressure in the chamber 60 will also increase, as will the difference between the pressures in chambers 60 and 74. When the fluid pressure differential equals a predetermined control differential pressure, movement of the valve member will stop and a steady state condition has been reached.

When the steering controller 24 is first actuated, the size of the orifice 64 is decreased and pilot fluid flow from the conduit 66 is directed to the inlet of the metering unit 35. The metering unit 35 is also supplied with fluid from the conduit 26 through the load sense orifice 34. The output of the metering unit 35 is directed to the expanding chamber of the power steering motor 28. The fluid from the contracting chamber of the power steering motor is directed to reservoir. During the instant that the variable orifice 64 closes, the pilot fluid flow through chamber 74 is blocked at the orifice. This provides an increase in pressure in chamber 74 which differs from the steering motor inlet pressure by an amount corresponding to the pressure drop across the orifice 76. The increased pilot fluid pressure assists the biasing spring 68 in moving the valve member 114 from the position shown in FIG. 5 toward the position shown in FIGS. 3 and 4.

If the auxiliary apparatus encounters a sudden increase in its load when the orifices 48 and/or 50 are open, the increase in fluid pressure is transmitted through the priority control orifice 22 to the conduit 26. The increased fluid pressure in the conduit 26 is transmitted to the variable volume chamber 60 and urges the valve member 114 toward the right (as viewed in FIG. 3). Movement of valve member 114 momentarily reduces the pilot flow and steering flow of fluid to enable the auxiliary apparatus to overcome the sudden increase the load applied to the auxiliary apparatus. However, if the increase in fluid pressure transmitted to the auxiliary apparatus 16 is relatively short in duration. The fluid pressure in the variable volume chamber 60 is soon reduced to a level at which the spring 168 moves the valve member 114 back toward the left to increase the size of the variable orifice 22 and maintain the desired flow through the conduit 26.

Priority Valve Assembly—Second Embodiment

Figure 6:
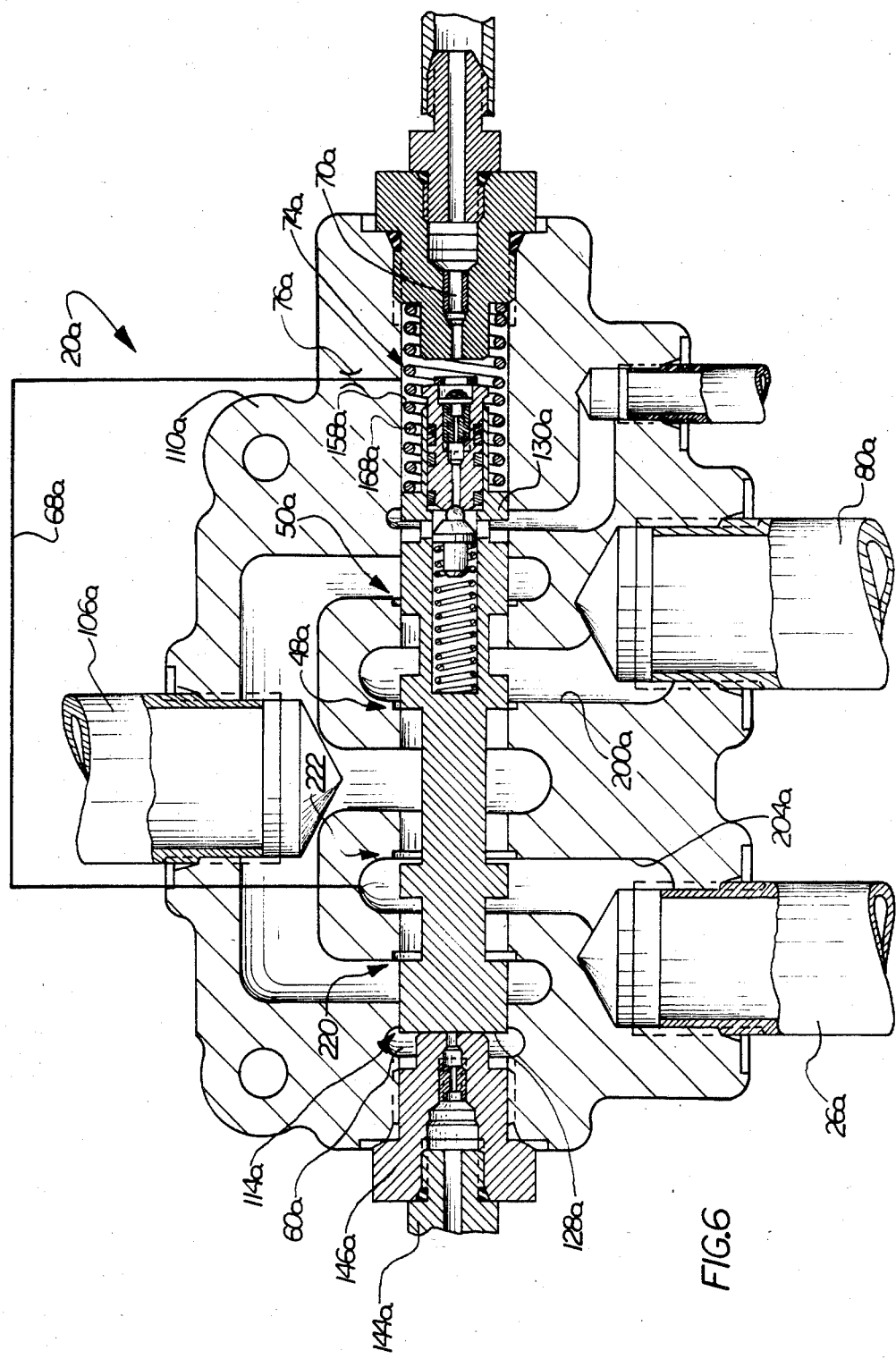
FIG. 6 is a second embodiment of the priority valve assembly.

In the embodiment illustrated in FIGS. 1 and 3, the priority valve assembly has a single orifice 22 through which fluid is directed to the power steering apparatus 14. However, in order to provide for a smooth and efficient handling of a large range of flows of fluid to the power steering apparatus 14, it may be preferred to use a pair of variable size orifices to direct fluid to the power steering apparatus 14. Accordingly, in the embodiment of the priority valve assembly illustrated in FIG. 6, a pair of variable size orifices is used to control fluid flow to the power steering apparatus 14 and a second pair of variable size orifices is used to control fluid flow to the auxiliary apparatus. Since the embodiment of the priority valve assembly illustrated in FIG. 6 is similar to the priority valve assembly illustrated in FIG. 3, similar numerals will be utilized to designate similar components, the suffix letter "a" being added to the embodiment shown in FIG. 6 in order to avoid confusion.

The priority valve assembly 20a of FIG. 6 includes two variable size orifices 48a and 50a which direct fluid flow to the auxiliary apparatus 16 in the same manner as described in connection with the embodiment of the priority valve assembly 20 shown in FIG. 3. In accordance with a feature of the embodiment of the priority valve assembly illustrated in FIG. 6, two orifices 220 and 222 are used to control the flow of fluid to the steering controller 24. The orifice 222 is a main priority flow control orifice and is open when either relatively large or small flows of fluid are directed to the steering fluid supply conduit 26a. The variable size orifice 220 is a secondary priority flow control orifice and is open only when relatively large flows of fluid are to be conducted to the power steering fluid supply conduit 26a.

The priority valve assembly 20a includes a valve member 114a having an end portion 128a which cooperates with the housing 110a to form a variable volume chamber 60a. The variable volume chamber 60a is connected in fluid communication with the power steering fluid supply conduit 26a through fittings 144a and 146a. Therefore, the fluid pressure in the variable volume chamber 60a varies as a function of the demand for fluid by the steering controller 24.

If there is an increase in the demand for fluid by the steering controller 24, the fluid pressure in the conduit 26a and the variable volume chamber 60a decreases. This results in movement of the valve member 114a toward the left (as viewed in FIG. 6) to increase the flow area available through the orifices 220 and 222 and thereby tend to satisfy the demand for fluid by the power steering system. At the same time, the flow areas through the orifices 48a and 50a are decreasing to decrease the flow of fluid conducted to the auxiliary apparatus. Conversely, if the demand for fluid by the power steering apparatus 14 decreases, the pressure in the conduit 26a increases with a resulting increase in the fluid pressure in the variable volume chamber 60a. This shifts the valve member 114a toward the right (as viewed in FIG. 6) to decrease the sizes of the orifices 220 and 222 and increase the sizes of the orifices 48a and 50a.

The right (as viewed in FIG. 6) end portion 130a of the valve member 114a is exposed to the pilot fluid pressure in a variable volume chamber 74a. The variable volume chamber 74a is connected in fluid communication with a source of pilot fluid pressure which is increased to signal the initiation of a steering operation and an impending demand for fluid by the steering controller 24. The manner in which this is accomplished is the same as was previously explained in connection with the embodiment of the invention shown in FIG. 3. A biasing spring 168a is provided in the variable volume chamber 74a to urge the valve member toward the left to the position shown in FIG. 6 in conjunction with the pilot fluid pressure in the variable volume chamber 74a.

Having described specific preferred embodiments of the invention, the following is claimed:

1. A priority valve for controlling fluid flow from a source of fluid to a steering circuit and an auxiliary circuit, said priority valve comprising a housing having an inlet port for connection to a source of fluid, a priority port for connection to a steering circuit, an auxiliary port for connection to an auxiliary circuit, and a pilot port for connection with a pilot flow control means in the steering circuit, the housing also having a plurality of fixed valve surfaces that at least partially define a fluid chamber communicating with said inlet port, means defining a pilot conduit communicating with said pilot port for directing a pilot flow of fluid thereto, a valve member disposed and movable in said fluid chamber to control fluid flow between said inlet port and said priority and auxiliary ports, said valve member having a plurality of axially extending lands which cooperate with said fixed valve surfaces to define a plurality of variable size orifices, said plurality of axially extending lands comprising a first land cooperating with one of said fixed valve surfaces to define a first one of said plurality of variable size orifices communicating with said inlet port and said priority port, a second land cooperating with another of said fixed valve surfaces to define a second one of said plurality of variable size orifices communicating with said inlet port and said auxiliary port, and a third land cooperating with a third one of said plurality of fixed valve surfaces to define a third one of said plurality of variable size orifices communicating with said inlet port and said auxiliary port and establishing a fluid flow parallel to the fluid flow through said second variable orifice, said second and third lands defining an axially extending circumferential groove in said valve member between said second and third lands that communicates said third variable orifice with said auxiliary port, means for exposing a first end portion of said valve member to a first fluid pressure, means for exposing a second end portion of said valve member to a second fluid pressure which is taken from the pilot flow of fluid, said valve member being movable in a first direction under the influence of a variation in a difference between the first and second fluid pressures to decrease the size of said first variable orifice and to open said second variable orifice, thereby decreasing flow to said priority port and increasing fluid flow to said auxiliary port, said valve member being movable farther in the first direction under the influence of a further variation in the difference between the first and second fluid pressures to decrease further the size of said first variable orifice, to increase the size of said second variable orifice, and to open said third variable orifice, thereby further decreasing flow to said priority port and increasing flow to said auxiliary port.

2. A priority valve as set forth in claim 1 wherein said housing defines two parallel passages communicating said inlet port with said first and third variable size orifices, respectively.

3. A priority valve as set forth in claim 1 wherein said plurality of axially extending lands further comprises a fourth land cooperating with a fourth one of said plurality of fixed valve surfaces to define a fourth one of said plurality of variable size orifices communicating with said inlet port and said priority port and establishing a fluid flow parallel to the fluid flow through said first variable size orifice.

4. A priority valve as set forth in claim 3 wherein said housing further defines a third passage parallel to said two parallel passages for communicating said inlet port with said fourth variable size orifice.

5. An apparatus as set forth in claim 1 wherein an increase in the fluid pressure on a side of said second orifice toward the auxiliary apparatus is transmitted through said first orifice and effects an increase in the fluid pressure to which the first end portion of said valve member is exposed to thereby effect an increase in the size of the second orifice.

6. A valve according to claim 1 further comprising spring means for applying a biasing force against the second end portion of the valve member.

* * * * *